United States Patent
Allart et al.

(10) Patent No.: US 7,013,774 B1
(45) Date of Patent: Mar. 21, 2006

(54) SHAVE TOOL AND TOOL HOLDER

(75) Inventors: Paul W. Allart, Rochester, NY (US);
David G. Cole, Rochester, NY (US);
Liberato Pietrantoni, Rochester, NY (US)

(73) Assignee: C.J. Winter Machine Technologies, Inc., Rochester, NY (US)

( * ) Notice: Subject to any disclaimer, the term of this patent is extended or adjusted under 35 U.S.C. 154(b) by 0 days.

(21) Appl. No.: 10/969,476

(22) Filed: Oct. 20, 2004

(51) Int. Cl.
*B23B 29/00* (2006.01)

(52) U.S. Cl. .......................................... 82/157; 82/162

(58) Field of Classification Search .................. 82/157, 82/158, 160, 162, 163, 100, 101, 12; 384/45
See application file for complete search history.

(56) References Cited

U.S. PATENT DOCUMENTS 3,094,024 A * 6/1963 Synk et al. .................. 82/157
5,809,855 A * 9/1998 Francia ........................ 82/157
6,105,476 A * 8/2000 Peterson et al. ............. 82/1.11

* cited by examiner

*Primary Examiner*—Willmon Fridie, Jr.
(74) *Attorney, Agent, or Firm*—Phillips Lytle LLP

(57) ABSTRACT

An improved tool holder, such as a shave tool (20), broadly includes: an adapter plate (23) adapted to be mounted on the screw machine (21) for controlled movement toward and away from the workpiece (W); a tool block (24) slidably mounted on the adapter plate for relative movement relative thereto along a first axis (x—x); a slide body (25) mounted on the tool block for rotation relative thereto about a second axis (y—y), an adjustment mechanism (28) acting between the slide body and the tool block for controllably varying the angular position of the slide body relative to the tool block; and a head (26) slidably mounted on the slide body for movement relative thereto along a third axis (z—z). The head has a roller (22) and cutting tool (T) spaced from the roller.

20 Claims, 4 Drawing Sheets

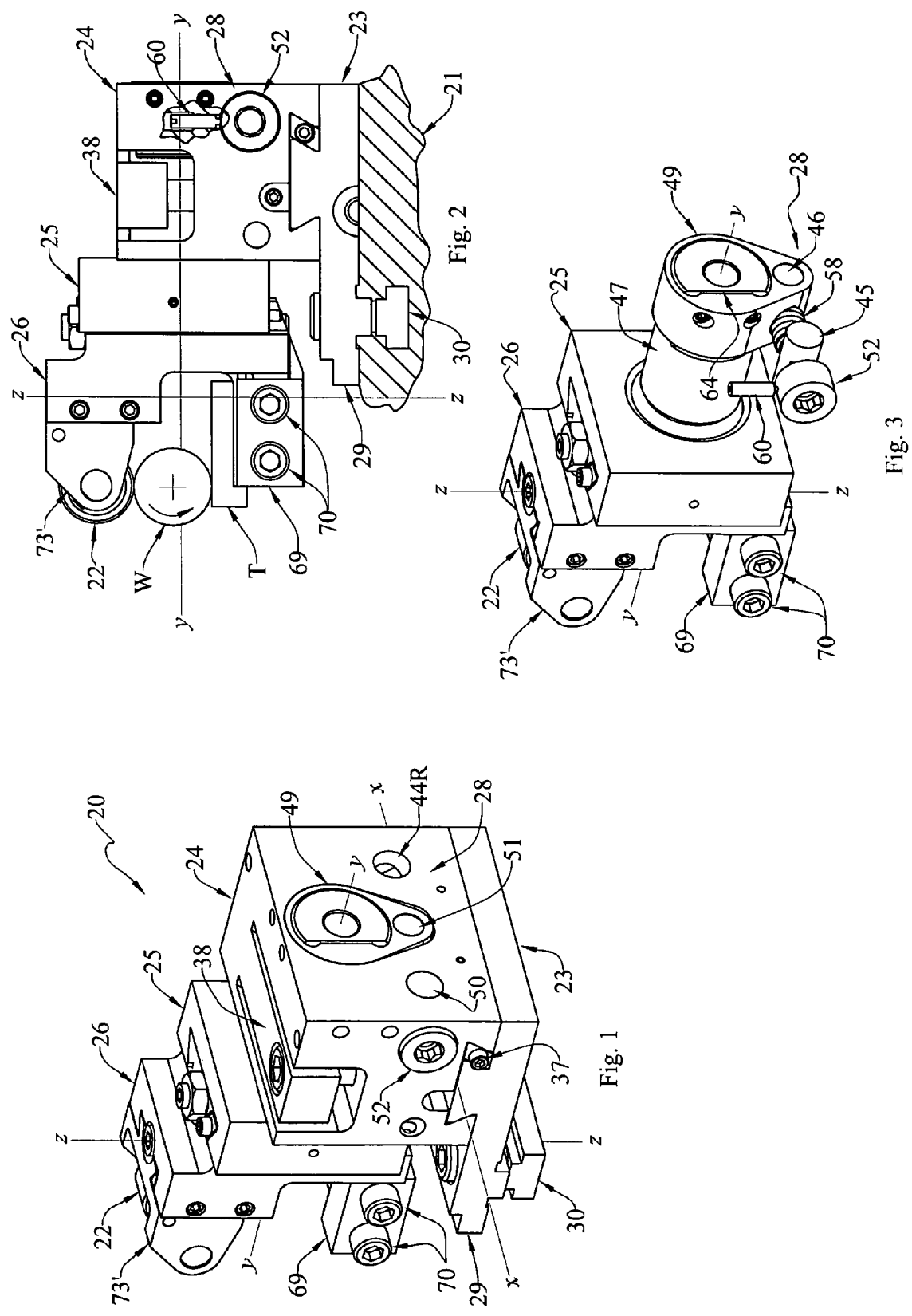

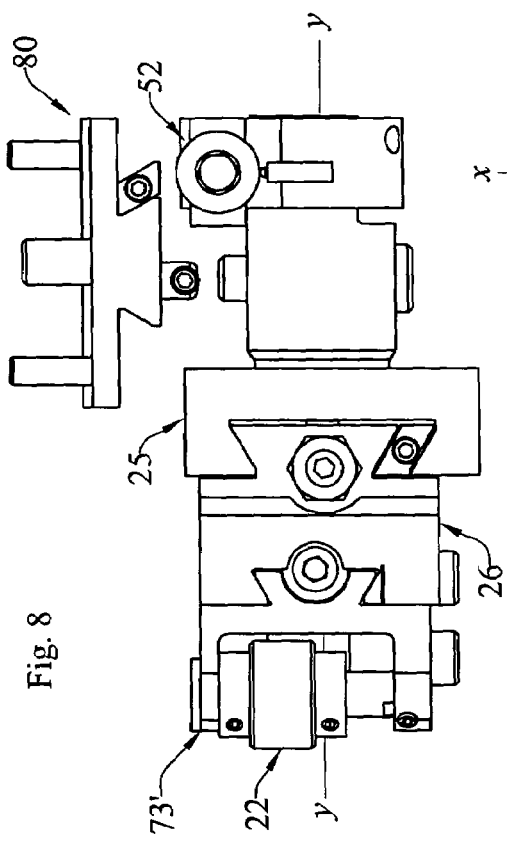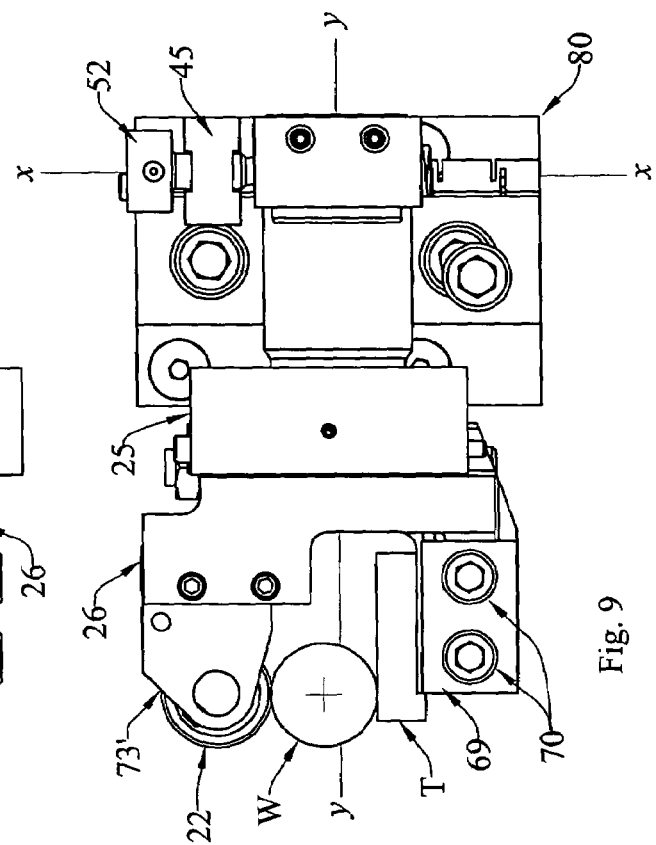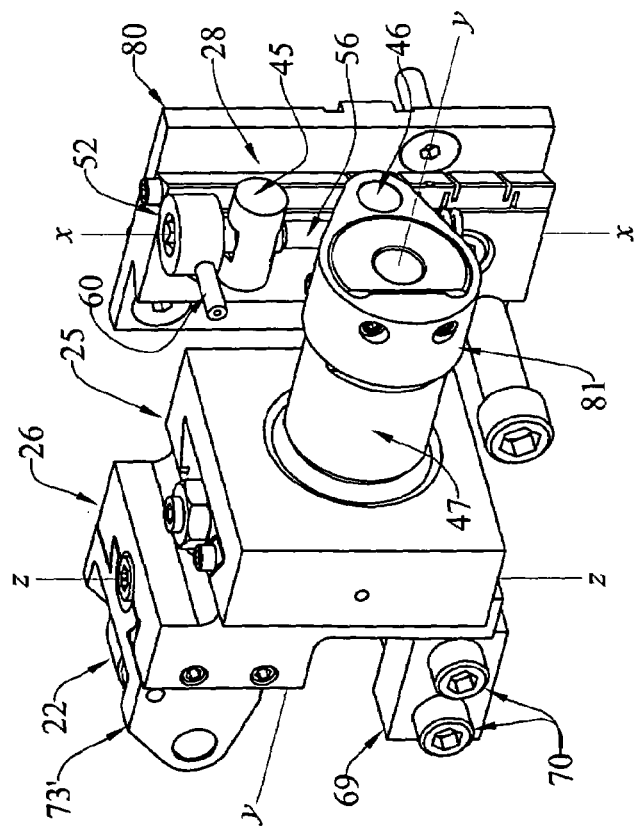

SHAVE TOOL AND TOOL HOLDER

TECHNICAL FIELD

The present invention relates generally to a machine tools, and, more particularly, to an improved shave tool or tool holder that is adapted to be mounted on an automatic screw machine and to be selectively moved toward and away from a rotating workpiece such that the tool will impart an action to the workpiece.

BACKGROUND ART

A screw machine is a machine in which the workpiece is rotated. A plurality of tools are then moved relative to the rotating workpiece, to impart an action thereto. For example, the action may be a drilling operation, a milling operation a shaping operation, formation of a thread, or the like.

The present invention relates generally to machine tools, and, more particularly, to an improved machine tool, such as a shave tool, that is adapted to be mounted on a Davenport® automatic screw machine, made by Davenport Machine, Inc., of 167 Ames Street, Rochester, N.Y. 14611. Other types of tool holders for use in Davenport®-type screw machines are representatively shown and described in U.S. Pats. No. 6,012,364, 6,082,234, 6,105,476 and 6,182,542, the aggregate disclosures of which are hereby incorporated by reference. However, the improved shave tool is not limited to use with this particularly type of machine, and may be used with other types of screw machines as well.

Some tools are used to remove stock on a gross basis, while other tools are used for a finer stock removal. These are sometimes called shave tools. While shave tools have been heretofore developed, it would be desirable to provide a shave tool having improved features, such as an improved means or mechanism for accurately and repeatedly positioning the tool relative to the workpiece.

DISCLOSURE OF THE INVENTION

With parenthetical reference to the corresponding parts, portions or surfaces of the disclosed embodiments, merely for purposes of illustration and not by way of limitation, the present invention provides an improved tool holder, such as (but not limited to) a shave tool, that is adapted to be mounted on a screw machine, and certain improvements in a tool holder that is adapted to be mounted on a screw machine.

In one aspect, the improved tool holder (20) broadly includes: an adapter plate (23) adapted to be mounted on the screw machine (21) for controlled movement toward and away from the workpiece (W); a tool block (24) slidably mounted on the adapter plate for relative movement relative thereto along a first axis (x—x) and adapted to be selectively locked to the adapter plate at a desired position along the first axis; a slide body (25) mounted on the tool block for rotation relative thereto about a second axis (y—y), the slide body also having a shaft (47) coincident with the second axis; an adjustment mechanism (28) acting between the slide body and the tool block for controllably varying the angular position of the slide body relative to the tool block; and a head (26) slidably mounted on the slide body for movement relative thereto along a third axis (z—z), the head having a roller (22) and having a cutting tool (7) spaced from the roller, the roller and cutting tool being adapted to selectively engage the workpiece when the tool holder is moved toward the workpiece to remove material therefrom; whereby the head may move or float relative to the tool block along the third axis such that the roller and cutting tool will both contact the workpiece when the tool holder is moved toward the workpiece. The improved tool holder may be a shave tool, or some other type of tool or tool holder.

In one form, the first, second and third axes are arranged at angles of about 90° with respect to one another. In another, the first and third axes are substantially parallel to one another.

The adjustment mechanism (28) may include: an eccentric member (49) mounted on the shaft (47) for movement therewith; a first pin (46) journalled on the eccentric member and having an internally-threaded first through-hole (51); a second pin (45) journalled on the tool block and having an internally-threaded second through-hole (50); and an adjustment member (52) rotatably mounted on the tool block and having externally-threaded first and second portions (51, 50, respectively) in mating engagement with the first and second pin holes, respectively, the threaded connections between the portions and holes being so configured and arranged that the linear movement of said first pin per revolution of the adjustment member is substantially equal to the difference between the linear movements per revolution of the first and second threaded portions; whereby the adjustment member may be selectively rotated relative to the tool block to controllably vary the angular position of the slide body relative thereto.

The adjustment mechanism may further include a spring (58) acting between the eccentric member and the first member for reducing backlash in the threaded connections. The adjustment member (52) may be a bolt-like member having a knurled outer surface (54) on its head portion (53). A detent (60) may be mounted on the tool block to engage the knurled head portion.

In a preferred form, a portion of the shaft (47) has a flat (64), and the eccentric member (49) has a D-shaped opening to accommodate passage of the portion of the shaft that has the flat. The tool block may have an opening that is so configured and arranged as to allow some rotational movement of said shaft and eccentric member relative to said tool block.

In another aspect, the invention provides an improvement in a tool holder (20) adapted to be mounted on a screw machine (21), the tool holder having a first member (24) adapted to be mounted on the screw machine for controlled movement toward and away from a rotatable workpiece (W), and having a second member (25) mounted on the first member for rotation about an axis (y—y), the second member having a shaft (47) coincident with the axis. The improvement broadly comprises: an adjustment mechanism (28) for adjusting and controlling the angular position of the second member relative to the first member. The adjustment member includes: an eccentric member (49) mounted on the shaft for movement therewith; a first pin (46) journalled on the eccentric member and having an internally-threaded first hole (50); a second pin (45) journalled on the first member and having an internally-threaded second hole (50); and an adjustment member (52) rotatably mounted on the first member and having externally-threaded first and second portions (56, 55) in mating engagement with the first and second pin holes (51, 50), respectively, the threaded connections between the portions and holes being so configured and arranged that the linear movement per revolution of the adjustment member is substantially equal to the difference between the linear movements per revolution of the first and second threaded portions; whereby the adjustment member may be selectively rotated relative to the first member to controllably vary the angular position of the second member relative thereto.

The tool holder may be a shave tool, the first member may be a tool block, and the second member may be a slide body.

The adjustment mechanism may further include a spring (58) acting between the eccentric member and the first member for reducing backlash in the threaded connections.

The adjustment member (52) may be a bolt-like member having a knurled outer surface (54) on its head portion (53). A detent (60) may be mounted on the first member and adapted to engage the knurled head portion.

In a preferred form, a portion of the shaft has a flat, and the eccentric member has a D-shaped opening to accommodate passage of the portion of the shaft that has the flat. The first member may have an opening that is so configured and arranged as to allow some relative rotational movement of the shaft and eccentric member relative to the first member.

Accordingly, the general object of the invention is to provide an improved tool holder.

Another object is to provide an improved shave tool for use on an automatic screw machine, such as a Davenport® automatic screw machine.

Still another object is to provide improvements in a tool holder.

These and other objects and advantages will become apparent from the foregoing and ongoing written specification, the drawings, and the appended claims.

BRIEF DESCRIPTION OF THE DRAWINGS

FIG. 1 is an isometric view looking at a left rear corner of the first form of an improved shave tool, depicting the shave tool by itself and not in association with either a screw machine or a workpiece.

FIG. 2 is a left side elevation of the improved shave tool shown in FIG. 1, and illustrating the workpiece, the cutting tool, and fragmentary portions of an automatic screw machine.

FIG. 3 is a left rear isometric view of the slide body-shave head subassembly, showing portions the shaft as extending rearwardly from the slide body along axis y—y, and showing the operative portions of the adjustment mechanism in association with the shaft-mounted eccentric member.

FIG. 7 is a left rear isometric view, generally similar to FIG. 3, of a second form of an improved shave tool, with the tool block removed for clarity of illustration, wherein the eccentric member is mounted differently on the shaft, and the adapter plate is shown as being vertically, rather than horizontally, arranged.

FIG. 8 is a top plan view of the shave tool shown in FIG. 7.

FIG. 9 is a left side elevation of the shave tool and adapter plate shown in FIG. 7.

DESCRIPTION OF THE PREFERRED EMBODIMENTS

Figure 4:
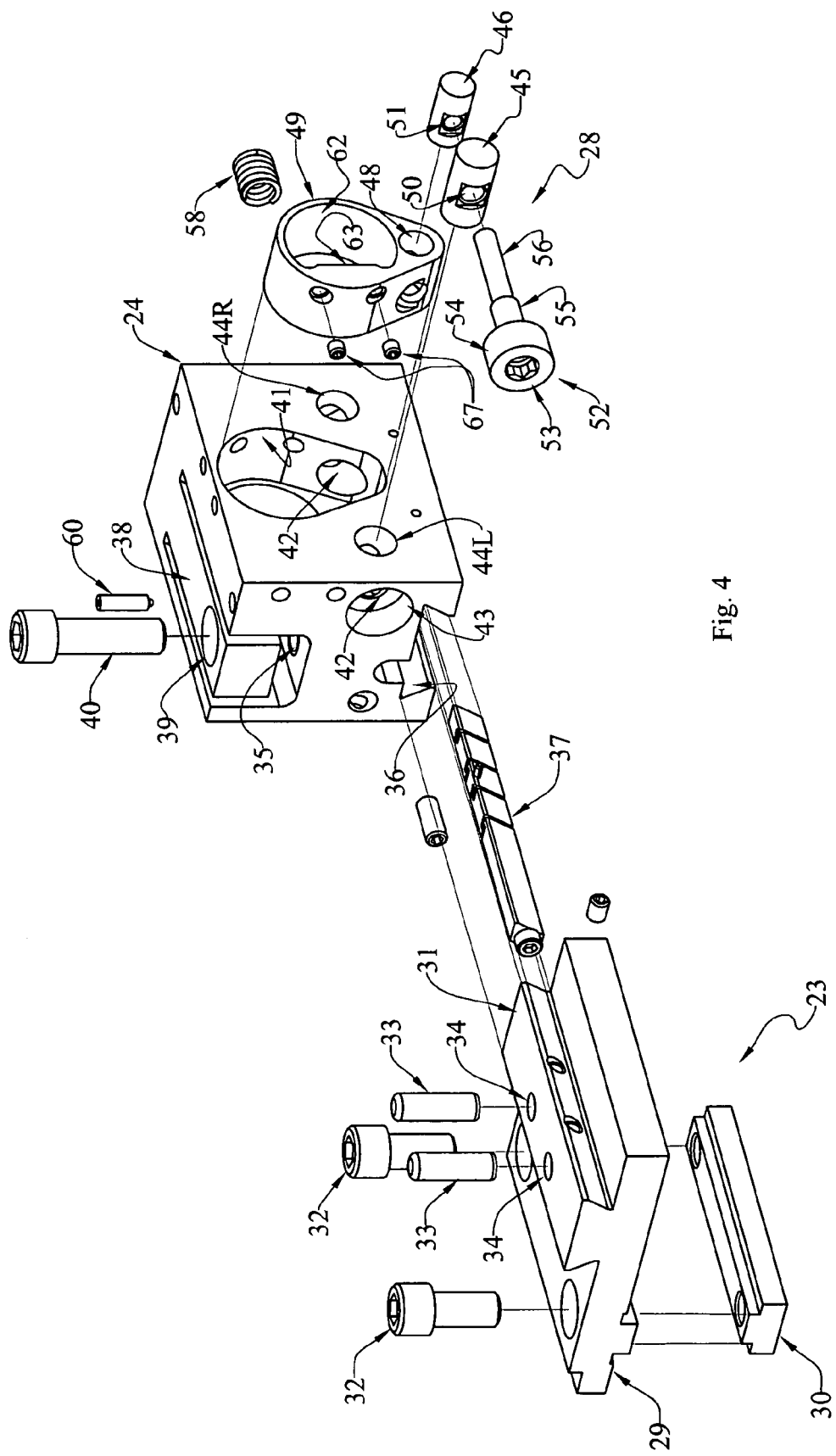
FIG. 4 is an exploded left rear isometric view of the tool block, the adapter plate, and portions of the adjustment mechanism shown in FIGS. 1–3.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

First Embodiment of Improved Shave Tool (FIGS. 1–6)

Referring now to the drawings, and, more particularly, to FIGS. 1–6 thereof, the present invention broadly provides an improved tool, of which one presently preferred form (e.g., a shave tool), is generally indicated at 20, that is adapted to be mounted on an automatic screw machine, a fragmentary portion of which is indicated at 21 in FIG. 2, and to be moved by that screw machine selectively toward and away a rotating workpiece W to impart an action (e.g., a turning operation) thereto. In FIG. 2, workpiece W is shown as being engaged by a roller 22 and a cutting tool T. In the following description, tool 20 is described as being a shave tool. However, the invention is not limited to this specific form.

As best shown in FIG. 1, the improved shave tool 20 broadly includes an adapter plate generally indicted at 23; a tool block, generally indicated at 24; a slide body, generally indicated at 25; a shave head, generally indicated at 26; and an adjustment mechanism, generally indicated at 28. The tool block 24 is mounted on the adapter plate for sliding movement along a horizontal first axis x—x. The slide body 25 is mounted on the tool block 24 for rotational movement about a horizontal second axis y—y. The shave head 26 is mounted on the slide body 25 for vertical movement along a third axis z—z. In the first form shown in FIGS. 1–3, these three axes are orthogonal (i.e., perpendicular) to one another. However, in a second form, shown in FIG. 9, the first and third axes (x—x and z—z, respectively) are parallel to one another. The tool T and roller 22 are operatively mounted on the shave head 26 for movement therewith.

Referring now to FIG. 4, the adapter plate 23 is shown as including, in pertinent part, a plate-like member 29 and a detachable portion 30 therebeneath. Plate-like portion 29 appears as a horizontally-elongated generally-rectangular plate-like member, and has a longitudinally-extending dovetail tongue 31 extending upwardly from its upper surface. The lower detachable part 30 is a horizontally-elongated member having an inverted somewhat T-shaped cross-section, and is adapted to be removably secured to the underside of member 29 by means of fasteners 32, 32 that penetrate holes in plate-like portion 29. Cylindrical locating pins 33, 33 have their lower marginal end portions received in blind holes 34, 34 that are drilled downwardly into dovetail tongue 31. Thus, the lower portions of pins 33, 33 will be received in holes 34, 34, and the upper portions of these pins will extend upwardly beyond dovetail tongue 31 through corresponding openings, one of which is indicated at 35, in the tool block.

The tool block 24 is shown as being a horizontally-elongated specially-configured rectangular member having a lower horizontal dovetail groove 36 which is adapted to slidably receive adapter plate dovetail tongue 31. Thus, the tool block is adapted to be slidably mounted on the adapter plate for movement relative thereto along first axis x—x. The relative position between these two members may be fixed by tightening a suitable locking gib, generally indicated at 37, that is also inserted into the dovetail groove so as to be positioned alongside the dovetail tongue. Thus, when gib 37 is locked, by rotating its fastener, the tool block will be mounted fast on adapter plate 23.

The tool block is shown as having an upper integral tongue-like spring 38 having a hole 39 at its distal end to accommodate passage of a threaded fastener 40. This tongue bears against the upper marginal end faces of locating pins 33, 33. An inverted teardrop-shaped opening 41 extends forwardly into the tool block from its rear face. A horizontal hole 42 is drilled through the tool block so as to intersect a lower portion of recess 41. This hole terminates in an enlarged recess 43 at either end to receive, accommodate and conceal the head portion of the adjustment member hereinafter described.

Two additional holes, 44L, 44R, extend forwardly into the tool block from its rear face. These holes are adapted to receive and accommodate pin 45 of adjusting mechanism 28, depending upon the orientation of same. In the arrangement shown in FIG. 1, pin 45 is inserted into hole 44L for rotation relative to the tool block. However, if the adjustment member (described infra) is inserted into the tool block from its right face (rather than from its left face, as shown in FIG. 4), then pin 45 would be inserted into hole 44R, and the adjustment mechanism would be arranged as a mirror image to that shown in FIG. 4. The adjustment mechanism is shown as including another pin 46 that is adapted to be received in an opening 48 in an inverted teardrop-shaped eccentric member 49 for rotation relative thereto. Each of pins 45, 46 is a cylindrical member having a tapped through-hole. More particularly, pin 45 is shown as having an internally-threaded hole 50, and pin 46 is shown as having an internally-threaded hole 51.

Adjustment member 52 is a bolt-like member having an enlarged-diameter head portion 53 having a knurled outer surface 54, and has a shank portion with two series-connected threads. More particularly, the shank portion has a threaded portion 55 extending away from head portion 53, and another threaded portion 56 of reduced diameter continuing outwardly therefrom. Threaded portion 55 is adapted to matingly engage tapped hole 50 in pin 45, and second threaded portion 56 is adapted to matingly engage threaded portion 51 in pin 46. In FIGS. 1–3, the adjustment member extends rightwardly into the tool block from its left face. However, the orientation of the adjustment member relative the tool block may be selectively reversed with pin 45 being inserted into hole 44R, and with the adjustment member being inserted into the tool block from its right face.

In the preferred embodiment, threaded portion 55 has 28 threads per inch, and threaded portion 56 has 32 threads per inch. Both are right-hand threads. Hence, as the adjustment member is rotated relative to the tool body, the linear movement of pin 46 per revolution of the adjustment member will be substantially equal to the difference between the linear movements per revolution of the first and second threaded portions. Thus, one revolution of the adjustment member will cause an advancement of threaded portion 55 by $\frac{1}{28}$=0.0357142 inches. Similarly, one revolution of threaded portion 56 will produce a linear movement of $\frac{1}{32}$=0.03125 inches. The difference between these two threads is 0.0357142−0.03125=0.0044642 inches. This translates to an equivalence of about $\frac{1}{0.0044642}$=224.0043 threads per inch. In other words, one revolution of adjustment member 52 will produce a net linear motion of pin 46 of 0.0044642 inches. Hence, the adjustment member has an effective combined thread of about 224 threads per inch.

Thus, restating the device is arranged such that pin 45 is rotatably received in hole 44L, and pin 46 is rotatably received in eccentric member hole 48. The adjustment member is threaded to engage the first and second pins. As the adjustment member is rotated, the net linear advance of eccentric-mounted pin 46 is the difference between the advances of the first and second threaded portions 55, 56. In the preferred embodiment, this turns out to be a net translation of about 0.0044642 inches per revolution of the adjustment member, which translates to and effective fine thread of about 224 threads per inch. A coil spring 54 is biased to act between the tool block and the eccentric member to eliminate backlash in the connection therebetween.

As best shown in FIG. 3, the eccentric member 49 has a large diameter axial through-hole 62 provided with a flat 63 thereon. Shaft 47 is similarly provided with a flat 64. Thus, the opening through the eccentric member appears to be somewhat D-shaped, when seen in rear elevation. The eccentric member is slipped over the distal end of shaft 47 and is locked to the shaft by means of said screws 67, 67. As shown in FIG. 3, spring 58 may surround a portion of the adjustment member, and may have one end bear against pin 45, and may have its other end bear against eccentric member 49.

As best shown in FIG. 2, and as schematically indicated in FIGS. 3, 7 and 8, the detent pin 60 is mounted on the tool block, and has one end face arranged to engage the knurled outer surface of the adjustment member. This provides a tactile and audible click when the head of the adjustment member is rotated. The individual knurls are not shown in any of the drawings. However, persons skilled in this art will readily appreciate how the detent pin with make audible sound when the adjustment member is rotated relate to the tool block.

Figure 5:
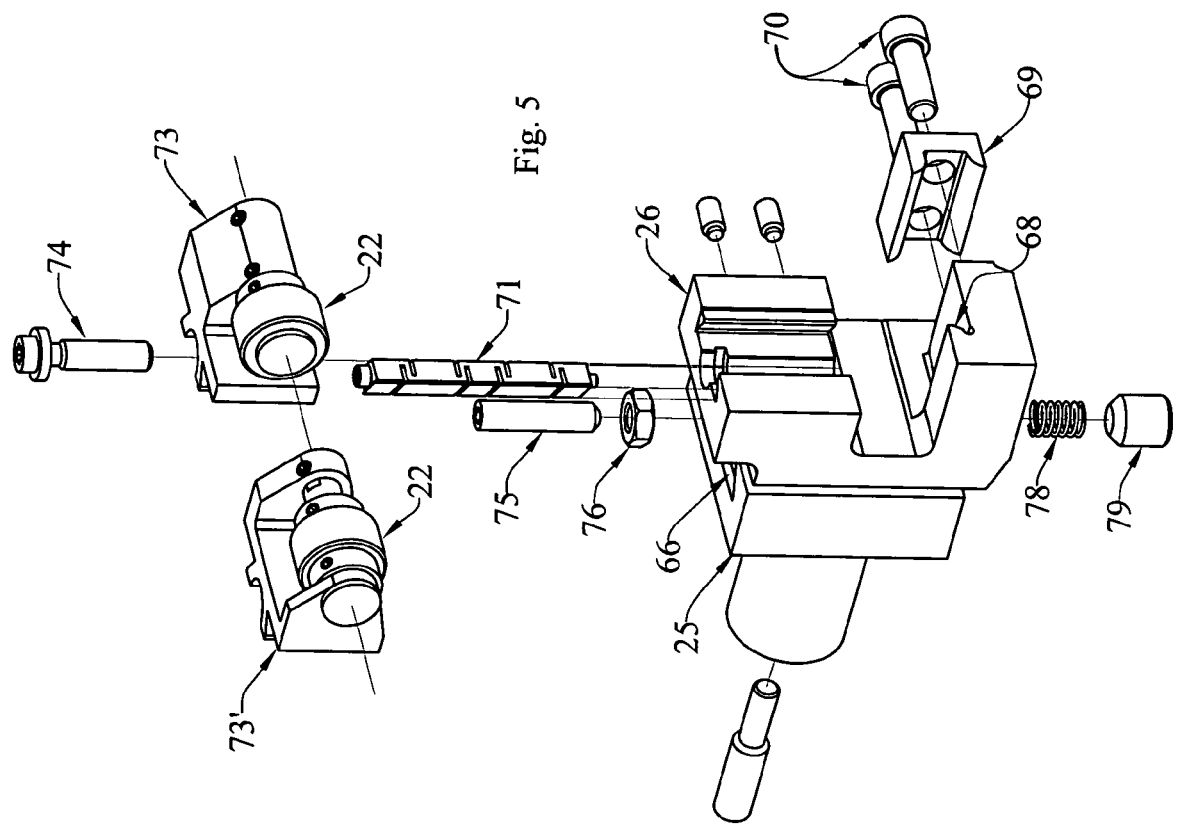
FIG. 5 is an exploded right front isometric view of the slide body-shave head subassembly.
Figure 6:
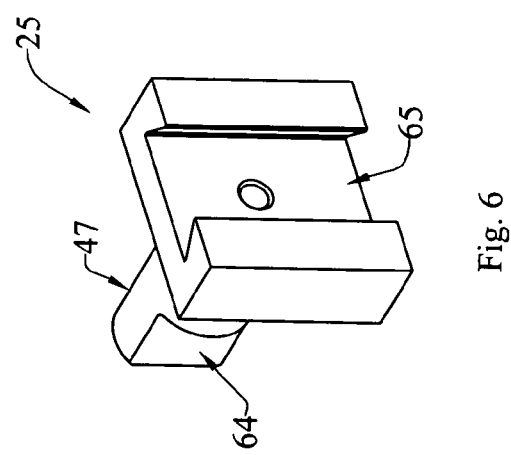
FIG. 6 is a right front isometric view of the shave head shown in FIG. 5.

FIG. 5 is an exploded isometric view looking at the right front corner of the shave head-tool block subassembly.

The shave head and slide body are shown as being operatively mounted on one other. More particularly, the slide body has a vertical dovetail groove 65, must clearly shown in FIG. 6.

Referring now back to FIG. 5, the shave head 26 is shown as being a specially-configured member having a dovetail tongue 66 adapted to be slidably inserted into the dovetail groove of the slide body. Adjacent its lower portion, the shave tool has a stationary jaw 68 and a movable jaw 69. The movable jaw is adapted to be mounted on the lower portion of the shave head by means of fasteners 70, 70. The two jaws 68, 69 are adapted to capture a cutting tool (not shown in FIG. 5). The sliding gib 71 is adapted to be selectively inserted into the dovetail connection between the slide body and the shave head. A roller holder 73 is adapted to be slidably inserted into a dovetail-like connection provided on the upper portion of the shave head. In FIG. 5, two roller holders are depicted. Roller holder 73 supports the roller as a cantilever, from one end thereof, whereas alternative roller holder 73 prime is shown as having left and right flanges to support shafts on either side of roller 22. Either roller holder 73 or 73 prime may be used. The roller holder is adapted to be secured to the shave head by means of a headed fastener 74. A threaded fastener 75 is operatively arranged to meet with a nut 76, and have its shank portion passed through a spring 78, with its distal marginal end portion received in a member 79. Thus, the shave head is spring biased toward an upper portion relative to the slide body. However, as previously noted, spring 78 allows the shave head to move vertically within the dovetail joint, or to "float" relative to the slide body. Thus, as the improved tool holder is moved toward the workpiece, the shave head may float relative to the slide body so that the cutting tool and roller will both engage the work-piece.

Second Embodiment of Improved Shave Tool (FIGS. 7–9)

Referring now to FIGS. 7–9, a second form of the improved shave tool is shown and described. Since the second form has many features in common with those of the first form, like reference numerals will be again used to identify like structure.

In FIGS. 7–9, the tool block has been removed for clarity of illustration. Since many of the parts are common to those previously described, a detailed description thereof will be avoided to minimize redundancy. Rather, the following description will focus on the differences between the first and second forms.

In the first embodiment, tool block 24 was mounted on adaptor plate 23 for movement along horizontal axis x—x. In the second form, axis x—x is arranged to be substantially parallel to axis z—z. This vertical adaptor plate, indicated at 80 is similarly adapted to be mounted on the automatic screw machine.

Another difference is that eccentric member 81, which is generally similarly to eccentric member 49 is oriented 90° in a counterclockwise direction from that shown in FIG. 4. Again, the eccentric member 81 is mounted on the distal end of shaft 47. However, it is oriented 90° in a clockwise direction from shown in FIG. 4. The adjustment mechanism 28 is substantially the same as that previously described, although the adjustment member is vertically arranged, rather than horizontally arranged. However, the adjustment mechanism functions in substantially the same manner heretofore described with respect to the first embodiment. Thus, the principal difference between the first and second embodiment lies within the orientation of the adaptor plate and with the orientation of the eccentric member on the distal end of the shaft. Another difference is that the adjustment mechanism in the second form is arranged vertically rather than horizontally. Otherwise, the two devices operate in substantially the same way.

MODIFICATIONS

The present invention expressly contemplates that many changes and modifications may be made. For example, while presently-preferred forms of the various component parts have been shown and described, persons skilled in this art will readily appreciate that various changes may be made. For example, while the dovetail connection is presently preferred, other types of connections could be used. The invention is not limited to use with a floating shave tool, but could be used on other types of tools and mechanisms as well. The roller holder may also have various forms. The presence of locking and sliding gibs, while preferred, may be changed or modified, as desired. The particular shape and configuration of the individual parts may also be changed or varied. The materials of construction are not deemed to be particularly critical, and may be changed or varied.

Therefore, while two presently-preferred forms of the improved shave tool have been shown and described, and several modifications thereof discussed, persons skilled in this art will readily appreciate that various additional changes and modifications may be made without departing from the spirit of the invention, as defined and differentiated by the following claims.

What is claimed is:

1. A tool adapted to be mounted on a screw machine, comprising:
   an adapter plate adapted to be mounted on said screw machine for controlled movement toward and away from said workpiece;
   a tool block slidably mounted on said adapter plate for relative movement relative thereto along a first axis and adapted to be selectively locked to said adapter plate at a desired position along said first axis;
   a slide body mounted on said tool block for rotation relative thereto about a second axis, said slide body also having a shaft coincident with said second axis;
   an adjustment mechanism acting between said slide body and said tool block for controllably varying the angular position of said slide body relative to said tool block; and
   a head slidably mounted on said slide body for movement relative thereto along a third axis, said head having a roller and having a cutting tool spaced from said roller, said roller and cutting tool being adapted to selectively engage said workpiece when said tool is moved toward said workpiece to remove material therefrom;
   whereby said head may move relative to said tool block along said third axis such that said roller and cutting tool will both contact said workpiece when said tool is moved toward said workpiece.

2. A tool as set forth in claim 1 wherein said first, second and third axes are arranged at angles of about 90° with respect to one another.

3. A tool as set forth in claim 1 wherein said first and third axes are substantially parallel to one another.

4. A tool as set forth in claim 1 wherein said adjustment mechanism includes:
   an eccentric member mounted on said shaft for movement therewith;
   a first pin journalled on said eccentric member, and having an internally-threaded first through-hole;
   a second pin journalled on said tool block, and having an internally-threaded second through-hole; and
   an adjustment member rotatably mounted on said tool block and having externally-threaded first and second portions in mating engagement with said first and second pin holes, respectively, the threaded connections between said portions and holes being so configured and arranged that the linear movement of said first pin per revolution of said adjustment member is substantially equal to the difference between the linear movements per revolution of said first and second portions;
   whereby said adjustment member may be selectively rotated relative to said tool block to vary the angular position of said slide body relative thereto.

5. The improvement as set forth in claim 4, wherein said adjustment mechanism further comprises:
   a spring acting between said eccentric member and said first member for reducing backlash in said threaded connections.

6. The improvement as set forth in claim 4 wherein said adjustment member is a bolt-like member.

7. The improvement as set forth in claim 4 wherein said bolt has a head portion.

8. The improvement as set forth in claim 7 wherein the outer surface of said head portion is knurled.

9. The improvement as set forth in claim 8, and further comprising:
- a detent adapted to engage said knurled head portion.

10. The improvement as set forth in claim 4 wherein a portion of said shaft has a flat, and wherein said eccentric member has a D-shaped opening to accommodate passage of the portion of said shaft that has said flat.

11. The improvement as set forth in claim 10 wherein said tool block has an opening that is so configured and arranged as to allow some rotational movement of said shaft and said eccentric member relative to said tool block.

12. In a tool holder adapted to be mounted on a screw machine, said tool holder having a first member adapted to be mounted on said screw machine for controlled movement toward and away from a rotatable workpiece, and having a second member mounted on said first member for rotation about an axis, said second member having a shaft coincident with said axis, the improvement which comprises:
- an adjustment mechanism for adjusting and controlling the angular position of said second member relative to said first member, said adjustment member including:
- an eccentric member mounted on said shaft for movement therewith;
- a first pin journalled on said eccentric member, and having an internally-threaded first hole;
- a second pin journalled on said first member, and having an internally-threaded second hole; and
- an adjustment member rotatably mounted on said first member and having externally-threaded first and second portions in mating engagement with said first and second pin holes, respectively, the threaded connections between said portions and holes being so configured and arranged that the linear movement of said first pin per revolution of said adjustment member is substantially equal to the difference between the linear movements per revolution of said adjustment member of said first and second portions;
- whereby said adjustment member may be selectively rotated relative to said first member to vary the angular position of said second member relative thereto.

13. The improvement as set forth in claim 12 wherein said tool holder is a tool, said first member is a tool block, and said second member is a slide body.

14. The improvement as set forth in claim 12, wherein said adjustment mechanism further comprises:
- a spring acting between said eccentric member and said first member for reducing backlash in said threaded connections.

15. The improvement as set forth in claim 12 wherein said adjustment member is a bolt-like member.

16. The improvement as set forth in claim 15 wherein said bolt has a head portion.

17. The improvement as set forth in claim 16 wherein the outer surface of said head portion is knurled.

18. The improvement as set forth in claim 17, wherein said adjustment mechanism further comprises:
- a detent mounted on said first member and adapted to engage said knurled head portion.

19. The improvement as set forth in claim 12 wherein a portion of said shaft has a flat, and wherein said eccentric member has a D-shaped opening to accommodate passage of the portion of said shaft that has said flat.

20. The improvement as set forth in claim 19 wherein said tool block has an opening that is so configured and arranged as to allow some relative movement of said shaft and said eccentric member relative to said tool block.

\* \* \* \* \*